(12) United States Patent
Kishi et al.

(10) Patent No.: US 8,211,254 B2
(45) Date of Patent: Jul. 3, 2012

(54) CAN CAP SEALING COMPOSITION AND USE THEREOF

(75) Inventors: Yoichi Kishi, Chigasaki (JP); Shigeki Hayashi, Sagamihara (JP); Yasushi Ikeshiro, Sagamihara (JP)

(73) Assignee: W. R. Grace & Co.-Conn., Columbia, MD (US)

( * ) Notice: Subject to any disclaimer, the term of this patent is extended or adjusted under 35 U.S.C. 154(b) by 49 days.

(21) Appl. No.: 12/601,138

(22) PCT Filed: Jun. 12, 2008

(86) PCT No.: PCT/US2008/066682
§ 371 (c)(1),
(2), (4) Date: Nov. 20, 2009

(87) PCT Pub. No.: WO2008/157217
PCT Pub. Date: Dec. 24, 2008

(65) Prior Publication Data
US 2010/0163156 A1    Jul. 1, 2010

(30) Foreign Application Priority Data

Jun. 15, 2007 (JP) ................................. 2007-158222

(51) Int. Cl.
*B65B 7/00* (2006.01)
*B29C 65/00* (2006.01)
*B32B 37/00* (2006.01)
*C09J 4/00* (2006.01)
*C09J 101/00* (2006.01)
*C09J 201/00* (2006.01)

(52) U.S. Cl. ............................. 156/69; 156/292; 156/338

(58) Field of Classification Search ............... 156/60, 156/69, 196, 216, 217, 218, 227, 242, 244.11, 156/244.27, 245, 246, 285, 286, 292, 307.1, 156/307.3, 307.5, 307.7, 321, 325, 326, 327, 156/334, 338; 524/80, 394, 400, 401, 424, 524/425, 426, 427, 430, 432, 436, 437, 442, 524/443, 444, 445, 447, 451, 452, 492, 493, 524/494, 495, 496, 497
See application file for complete search history.

(56) References Cited

U.S. PATENT DOCUMENTS

| | | | | |
|---|---|---|---|---|
| 2,780,605 A | * | 2/1957 | Bevilacqua | 521/65 |
| 2,985,632 A | * | 5/1961 | Willis | 525/345 |
| 3,259,599 A | * | 7/1966 | Walker | 525/130 |
| 3,774,560 A | * | 11/1973 | Hartz | 413/6 |
| 3,986,629 A | * | 10/1976 | Singleton | 220/614 |
| 4,189,418 A | * | 2/1980 | Ueno et al. | 524/52 |
| 5,065,799 A | * | 11/1991 | Weiss | 141/39 |
| 5,739,184 A | * | 4/1998 | Marbry et al. | 523/403 |
| 5,804,237 A | * | 9/1998 | Diamond et al. | 426/131 |

FOREIGN PATENT DOCUMENTS

| | | |
|---|---|---|
| EP | 0182674 A2 | 5/1986 |
| JP | 3017872 B | 3/1991 |
| JP | 2888562 B1 | 5/1999 |
| JP | 2006-274168 A | 10/2006 |

OTHER PUBLICATIONS

Form PCT/ISA/210, International Search Report for International Application No. PCT/US2008/066682, dated Oct. 1, 2008, 4 pages.
Form PCT/IB/373, International Preliminary Report on Patentability (Chapter 1) for International Application No. PCT/US2008/066682, dated Dec. 17, 2009, 7 pages.
Martinez Marcos, European Examination Report for European Patent Application No. 08770813.7, Jul. 5, 2011, 2 pages.

* cited by examiner

*Primary Examiner* — Philip Tucker
*Assistant Examiner* — Brian R Slawski
(74) *Attorney, Agent, or Firm* — Stephan P. Williams; Craig K. Leon

(57) ABSTRACT

Disclosed are a can cap sealing composition having superior squeeze-out resistance and sealing performance and a method for using the same. A cap is coated with a sealing composition comprising a rubber component, a tackifier, a filler and an organic peroxide as essential ingredients, the cap is seamed to a filled can and then the sealed can is subjected to a heat-treatment in which a sterilization and a cross-linking reaction take place simultaneously.

11 Claims, No Drawings

CAN CAP SEALING COMPOSITION AND USE THEREOF

FIELD OF THE INVENTION

The present invention relates to a can cap sealing composition and use thereof, particularly to a can cap sealing composition suitable for beverage and food cans which are subjected to a high temperature sterilization and a method for using the same.

BACKGROUND OF THE INVENTION

Usually, in the manufacturing process of canned provisions, a can body is filled with beverage, food or other contents, a cap is placed thereon, the flange area of the can body and the curl area of the cap are double-seamed for sealing. A sealing composition is coated onto the curl area of the cap by means of a nozzle lining in advance of the seaming operation. The sealing composition fills in the very small spaces formed between the can body flange area and cap curl area after the double seaming operation in order to ensure the complete sealing of the can.

Conventional curing agent-free sealing compositions have a weakness in that they are easily squeezed out due to heat or external stress caused by a change in the inner pressure during the double seaming operation or high temperature sterilization step. In order to strengthen the squeeze-out resistance, there have been various sealing compositions formulated so as to make the formed layers hard at room temperature or so as to cure before the sealing operation. However, these other sealing compositions produce coatings that are too hard to obtain an appropriate seam thickness at the double seaming operation.

Typical known cap sealing compositions are disclosed in JP3-17872B, JP2888562B and JP2006-274168A.

SUMMARY OF THE INVENTION

An object of the present invention is to provide a can cap sealing composition superior in squeeze-out resistance and sealing performance and a method for using the same.

The present invention, firstly, resides in a can cap sealing composition which comprises a rubber component, a tackifier, a filler and an organic peroxide as essential ingredients.

The present invention, secondly, resides in a method for sealing a can which comprises coating an aqueous dispersion or organic solvent solution of the above can cap sealing composition onto the curl area of the cap followed by drying, thereby obtaining the cap having a coating on the curl area, said coating comprising a substantially un-cured composition, placing said cap thus obtained onto a can body filled with contents, sealing the can by seaming the flange area of the can body and the curl area of the cap to obtain a sealed can containing the contents, then subjecting the sealed can to a heat treatment thereby conducting a sterilization treatment and a curing treatment of the composition simultaneously.

A further object of the present invention is to provide a filled can that exhibits no squeeze-out phenomenon and exhibits excellent sealing performance.

DETAILED DESCRIPTION OF THE PREFERRED EMBODIMENTS

According to the present invention, there is provided a can cap sealing composition comprising a rubber component, a tackifier, a filler and an organic peroxide.

The rubber component used in the cap sealing composition may include various rubbers such as styrene-butadiene rubber, butadiene rubber, natural rubber and nitrile rubber. Styrene-butadiene rubber is preferred. Among them, the most preferable rubber component is a styrene-butadiene rubber which has a gel content of the solid rubber or latex of 0-70 percent by weight, a Mooney viscosity of 30-150 ($ML_{1+4}$, 100° C.) and a styrene content of 20-50 percent by weight.

As the tackifier (resin component), there may be used various tackifiers such as rosin based resins, e.g. rosin, hydrogenated rosin, rosin ester, hydrogenated rosin ester and cured rosin, terpene based resins, e.g. α-pinene, β-pinene and dipentene, phenol-formaldehyde resins, phenol resins modified with a natural resin such as rosin or terpene, xylene-formaldehyde resin and modified resins thereof, and petroleum hydrocarbon based resins. The preferred tackifiers are rosin based resins and terpene based resins. The preferred amount of such a tackifier is 10-100 parts by weight per 100 parts by weight of the rubber component.

As the filler, there may be used various fillers such as silica based fillers, e.g. colloidal silica, hydrous silicic acid, synthetic silicate and unhydrous silicic acid, precipitated calcium carbonate, heavy calcium carbonate, activated calcium carbonate, kaolin, calcined clay, talc, aluminawhite, calcium sulfate, aluminum hydroxide, pumice powder, glass powder, zinc oxide, titanium dioxide and carbon black. The preferred fillers are silica, clay, titanium dioxide and talc. The preferred amount of the filler is 10-150 parts by weight per 100 parts by weight of the rubber component.

The present invention is characterized by using an organic peroxide together with the above essential components. The organic peroxide does not substantially promote a cross-linking reaction under an oxygen (air) atmosphere, but rather promotes a cross-linking reaction in the absence of oxygen (air) under heating. Thus, the present invention takes advantage of this special property of the organic peroxide. Preferred organic peroxides include those that promote a cross-linking reaction at a temperature of 100-150° C., preferably 110-140° C., in the absence of oxygen (air). Especially preferred are organic peroxides having a half-life of 2 hours or less. Examples of suitable organic peroxides include: peroxyketals such as 1,1-bis(t-butylperoxy)-2-methylcyclohexane, 1,1-bis (t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 1,1-bis (t-butylperoxy)cyclododecane and n-butyl-4,4-bis(t-butylperoxy) valerate; peroxyesters such as t-hexylperoxybenzoate, 2,5-dimethyl-2,5-di(benzoylperoxy) hexane, t-butylperoxybenzoate and di-t-butylperoxy isophthalate; alkyl peroxides such as dicumylperoxide, 2,5-dimethyl-2,5-di(t-butylperoxy)hexane, t-butylcumyl peroxide, di-t-butyl peroxide and di(2-t-butylperoxyisopropyl)benzene. Among them, the most preferred organic peroxides are alkyl peroxides. The preferred amount of the organic peroxide is 0.1-10 parts by weight per 100 parts by weight of the rubber component.

Various conventional additives may optionally be added to the cap sealing composition of the present invention. Examples of such optional additives include antioxidants such as phenol based-, amine based-, aldehyde-amine reaction product based-, ketone-amine reaction product based- and mixed amine based-antioxidants, thickeners, diluents, emulsifying agents and preservation agents.

The cap sealing composition may be used either in a solution system, where the composition is dissolved in an organic solvent, or in an aqueous system, where the composition is dispersed in water. The preferred solids concentration is 20-80 percent.

The use of an aqueous system is preferred in the present invention. In this case, the organic peroxide is preferably first dissolved or dispersed in a tackifier, such as a liquid rosin ester, in which it is compatible, and then the tackifier/peroxide are dispersed together with an emulsifying agent in water.

For the solution system, the organic solvent may include volatile organic solvents such as toluene, n-hexane, cyclohexane and methyl ethyl ketone.

The above-described cap sealing composition may be used in a canning process for manufacturing canned provisions as will be further explained.

The present invention is directed to metal cans (such as aluminum or steel cans) for beverages and foods, which metal cans typically include three piece cans (constituted by a top cap, a can body and a bottom cap), when used for coffee, tea and other non-foamable drinks, and two piece cans (constituted by a can body and a top cap, but no bottom cap), when used for beer, soda and other carbonated drinks and foods. The present invention can be applied to both types of cans.

In a three piece can, the present invention can be applied to the seaming of the bottom cap and the can body prior to filling the contents and the seaming of the top cap onto the can body after the contents are filled. Hereinafter, the latter embodiment is further explained.

The present sealing composition in a liquid system (aqueous or organic solvent) is applied from the cap seaming panel area to the curl area by means of a nozzle lining, followed by heat-drying to remove water in the case of an aqueous system (usually at about 90° C. for about 5 minutes) or to remove an organic solvent in the case of a solution system. During this drying step, the organic peroxide existing in the sealing composition does not substantially promote any cross-linking reaction since the drying step is conducted in an air atmosphere.

After the contents, such as beverage, are filled, the above cap coated with the present sealing composition is placed on the filled can body and then they are tightly interlocked by using a conventional double seam operation. The tightly seamed can thus obtained is subjected to a heat treatment for sterilizing the contents and also for promoting the cross-linking reaction of the sealing composition simultaneously.

The typical example of the heat treatment is a so-called retort sterilization treatment, which is carried out at a high temperature of higher than 100° C. In this step, the inner portion of the sealed area is in a closed condition isolated from oxygen (air) and at a high temperature, and thus the organic peroxide present therein promotes the cross-linking reaction of the sealing composition.

According to the present invention, the sealing composition cross-linked in the inner portion of the interlocked area has an improved strength, an improved resistance to external stress and improved sealing properties. Thus, the filled can subjected to the high temperature sterilization treatment exhibits substantially no squeeze-out and maintains excellent sealed conditions for a long period of time.

The present invention may be further understood by reference to the following examples.

EXAMPLES AND COMPARATIVE EXAMPLES

A SBR latex (gel content of 55%, Mooney viscosity of 34 and solid content of 50%) as a rubber component, 25 parts by weight of silica, 25 parts by weight of kaolin and 10 parts by weight of titanium dioxide as a filler, 0.4 part by weight of carbon as a coloring agent and 0.2 part by weight of a sodium salt of the condensation product of naphthalene sulfonic acid and formalin as a dispersing agent were mixed with water and pulverized in a ball mill to obtain a dispersion having a solid content of 48%. The dispersion thus obtained, 25% aqueous solution of a hydrogenated rosin ammonium salt as a stabilizer and tackifier, dicumyl peroxide (a product of Nippon Oil and Fat, sold under the trade name "Parkmill D") as an organic peroxide (in the range of 0.1-50 parts by weight) were dissolved and/or dispersed in a hydrogenated rosin ester.

The viscosity of the dispersion thus obtained was adjusted by using an aqueous solution of methyl cellulose to obtain an aqueous dispersion having a BH viscosity of 6,000-7,000 mPa·s (20 rpm, 25° C.) and a solid content of 39-40%, which was suitable for nozzle lining. The aqueous dispersion thus obtained was coated onto a tin free cap by means of a reciprocal liner (a machine made by Grace, #25 liner) and heat-dried in a air circulating oven at 90° C. for 10 minutes.

By using a small beverage can (190 ml), a boiled water as the contents was filled by using a reciprocal double seamer at the respective seaming conditions. Thereafter, the filled can was subjected to a retort sterilization treatment at 125° C. for 30 minutes. (The same conditions were used in both the Examples and the Comparative Examples.)

EXAMPLES

The conditions and results are shown in Table 1.

TABLE 1

| | | A | B | C | D | E |
|---|---|---|---|---|---|---|
| Composition of Sealing Compound | SBR | 100 | 100 | 100 | 100 | 100 |
| | dicumyl peroxide | 0.5 | 1.0 | 1.5 | 2.0 | 5.0 |
| | filler(s) | 60 | 60 | 60 | 60 | 60 |
| | tackifier | 50 | 50 | 50 | 50 | 50 |
| | other additives (thickner etc.) | 20 | 20 | 20 | 20 | 20 |
| Test Results | Number of Cans with squeeze-out (n = 100)[*1] | 3 | 2 | 1 | 0 | 0 |
| | Number of Cans with leakage with impact (n = 100)[*2] | 3 | 2 | 0 | 0 | 0 |
| | Percent Hook Overlap[*3] | ○ | ○ | ○ | ○ | ○ |

[*1]Test results at tight seam
[*2]Test results at normal seam
[*3]Test results at normal seam
○: higher than 55%
Δ: 45-55%
X: lower than 45%

COMPARATIVE EXAMPLES

The conditions and results are shown in Table 2.

TABLE 2

| | | F | G | H | I |
|---|---|---|---|---|---|
| Composition of Sealing Compound | SBR | 100 | 100 | 100 | 100 |
| | dicumyl peroxide | — | — | — | — |
| | filler(s) | 60 | 200 | 60 | 200 |
| | tackifier | 50 | 50 | 150 | 150 |
| | other additives (thickner etc.) | 20 | 20 | 20 | 20 |
| Test Results | Number of Cans with squeeze-out (n = 100)[*1] | 32 | 4 | 52 | 7 |

TABLE 2-continued

|  | F | G | H | I |
|---|---|---|---|---|
| Number of Cans with leakage with impact (n = 100)*² | 13 | 43 | 2 | 33 |
| Percent Hook Overlap*³ | ○ | X | ○ | Δ |

*¹Test results at tight seam
*²Test results at normal seam
*³Test results at normal seam
○: higher than 55%
Δ: 45-55%
X: lower than 45%

The invention claimed is:

1. A method for sealing a can which comprises coating an aqueous dispersion or organic solvent solution of a can cap sealing composition onto the curl area of a cap, drying the un-cured composition, placing the coated cap onto a can body filled with contents, sealing the can by seaming the flange area of the can body and the curl area of the cap to obtain a sealed can containing the contents, then subjecting the sealed can to a heat treatment thereby simultaneously conducting a sterilization treatment and a curing treatment of the composition to form a seal, wherein the can cap sealing composition comprises a rubber component, a tackifier, a filler and an organic peroxide, wherein the organic peroxide does not substantially promote a cross-linking reaction under an oxygen containing atmosphere, but promotes a cross-linking reaction in the absence of oxygen under heating.

2. The method according to claim 1 wherein the dispersion or solution of the can cap sealing composition is prepared by first dissolving or dispersing the organic peroxide in a tackifier which is miscible with the organic peroxide.

3. The method according to claim 1, wherein the organic peroxide is selected from the group consisting of 1,1-bis(t-butylperoxy)-2-methylcyclohexane, 1,1-bis (t-hexylperoxy)-3,3,5-trimethylcyclohexane, 1,1-bis(t-hexylperoxy) cyclohexane, 1,1-bis(t-butylperoxy)-3,3,5-trimethylcyclohexane, 1,1-bis(t-butylperoxy) cyclohexane, 1,1-bis(t-butylperoxy) cyclododecane, n-butyl-4,4-bis(t-butylperoxy) valerate, t-hexylperoxybenzoate, 2,5-dimethyl-2,5-di(benzoylperoxy) hexane, t-butylperoxybenzoate and di-t-butylperoxy isophthalate, dicumylperoxide, 2,5-dimethyl-2,5-di(t-butylperoxy)hexane, t-butylcumyl peroxide, di-t-butyl peroxide and di(2-t-butylperoxyisopropyl) benzene.

4. The method according to claim 1, wherein the organic peroxide is an alkyl peroxide.

5. The method according to claim 1, wherein the organic peroxide is dicumyl peroxide.

6. The method according to claim 3, wherein the organic peroxide is included in an amount of 0.1-10 parts by weight per 100 parts by weight of the rubber component.

7. The method according to claim 6, wherein the tackifier is at least one selected from the group consisting of rosin-based resins, terpene-based resins and petroleum hydrocarbon-based resins and the amount of the tackifier is 10-100 parts by weight per 100 parts by weight of the rubber component.

8. The method according to claim 7, wherein the filler is at least one selected from the group consisting of silica, clays, titanium oxides and talc and the amount of the filler is 5-150 parts by weight per 100 parts by weight of the rubber component.

9. The method according to claim 8, wherein the rubber component is a styrene-butadiene rubber.

10. The method according to claim 9, wherein the styrene-butadiene rubber has a gel content of 0-70 wt. %, a Mooney viscosity of 30-150 ($ML_{1+4}$, 100° C.) and a styrene content of 20-50 wt. %.

11. The method according to claim 9, wherein the organic peroxide is dicumyl peroxide.

* * * * *